(12) United States Patent
Crompvoets et al.

(10) Patent No.: US 11,560,994 B2
(45) Date of Patent: *Jan. 24, 2023

(54) LIGHTING DEVICE WITH LIGHT GUIDE

(71) Applicant: Lumileds LLC, San Jose, CA (US)

(72) Inventors: Floris Maria Hermansz Crompvoets, Bunde (NL); Matthias Epmeier, Aachen (DE); Florent Monestier, Kerkrade (NL)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/193,816

(22) Filed: Mar. 5, 2021

(65) Prior Publication Data

US 2021/0348733 A1  Nov. 11, 2021

(30) Foreign Application Priority Data

Mar. 6, 2020 (EP) .................................... 20161409

(51) Int. Cl.
*F21V 19/00* (2006.01)
*F21S 41/24* (2018.01)
(Continued)

(52) U.S. Cl.
CPC ............. *F21S 41/24* (2018.01); *F21S 41/148* (2018.01); *F21S 45/47* (2018.01)

(58) Field of Classification Search
CPC .......... F21S 41/148; F21S 45/47; F21S 43/14; F21Y 2107/30; F21Y 2107/40; F21Y 2107/90; F21Y 2115/10; F21Y 2101/00; F21Y 2105/12; F21Y 2107/00; F21Y 2105/10; F21V 29/713
See application file for complete search history.

(56) References Cited

U.S. PATENT DOCUMENTS 7,784,971 B2 * 8/2010 Dorogi .................... F21V 29/75
362/249.02
8,067,881 B2 * 11/2011 Kazmierski ............... F21V 7/06
313/111

(Continued)

FOREIGN PATENT DOCUMENTS

DE       102011005926     9/2012
JP       2010-198847      9/2010

(Continued)

OTHER PUBLICATIONS

Extended European Search Report dated Jul. 16, 2020 for European Patent Application No. 20161409.6.

*Primary Examiner* — Omar Rojas Cadima
(74) *Attorney, Agent, or Firm* — Volpe Koenig

(57) ABSTRACT

A lighting device includes a carrier having at least one section that has a triangular cross section. The carrier includes at least one mounting portion on an edge of the triangular cross section, and a heat sink body portion adjacent to, and protruding sidewards from, the at least one mounting portion. At least one structure is mounted to the at least one mounting portion. The at least one structure includes at least one mounting face having an arrangement direction. The at least one lighting module is mounted along the arrangement direction on the at least one mounting face. The at least one light guide is optically coupled to the at least one lighting module.

12 Claims, 9 Drawing Sheets

(51) Int. Cl.
   *F21S 41/148*   (2018.01)
   *F21S 45/47*    (2018.01)

(56) References Cited

U.S. PATENT DOCUMENTS

| | | | |
|---|---|---|---|
| 2014/0016335 A1* | 1/2014 | Cho | B60Q 1/085 |
| | | | 362/466 |
| 2016/0040848 A1 | 2/2016 | Tsukamoto | |
| 2017/0146211 A1 | 5/2017 | Wu | |
| 2018/0283644 A1 | 10/2018 | Mertens et al. | |
| 2020/0032973 A1 | 1/2020 | Renaud et al. | |

FOREIGN PATENT DOCUMENTS

| | | | |
|---|---|---|---|
| KR | 20150075301 A | * | 7/2015 |
| KR | 20180106191 A | * | 10/2018 |
| WO | 2009/037645 | | 3/2009 |

* cited by examiner

LIGHTING DEVICE WITH LIGHT GUIDE

CROSS REFERENCE TO RELATED APPLICATION

This application claims the benefit of EP 20161409.6, filed Mar. 6, 2020, which is incorporated by reference as if fully set forth.

FIELD OF INVENTION

The present disclosure relates to a lighting device comprising a carrier and a light guide for the lighting modules in applications such as automotive lighting.

BACKGROUND

Halogen lamps have been the default light source for many years for automotive head-lighting. However, current LED technology provides much better conversion efficiency and accurate beam pattern design possibilities. As a result, LED retrofit headlamps are seriously considered as a legal replacement for halogen headlamps. Besides better energy efficiency and higher luminous flux, life-time and early mortality of LED headlamps are also much better.

Although the share of new cars originally equipped with full LED headlamps increases year after year, the number of cars in use that are equipped with such halogen headlamps represents still more than 60% of the volume of headlamp bulbs in use. In terms of potential headlamp units replacement, that means a very large potential market is available for such retrofit headlamps.

SUMMARY

A lighting device includes a carrier having at least one section that has a triangular cross section. The carrier includes at least one mounting portion on an edge of the triangular cross section, and a heat sink body portion adjacent to, and protruding sidewards from, the at least one mounting portion. At least one structure is mounted to the at least one mounting portion. The at least one structure includes at least one mounting face having an arrangement direction. The at least one lighting module is mounted along the arrangement direction on the at least one mounting face. The at least one light guide is optically coupled to the at least one lighting module.

BRIEF DESCRIPTION OF THE DRAWING

Examples of the invention will now be described in detail with reference to the accompanying drawing, in which.

DETAILED DESCRIPTION OF THE PREFERRED EMBODIMENTS

Figure 1A:
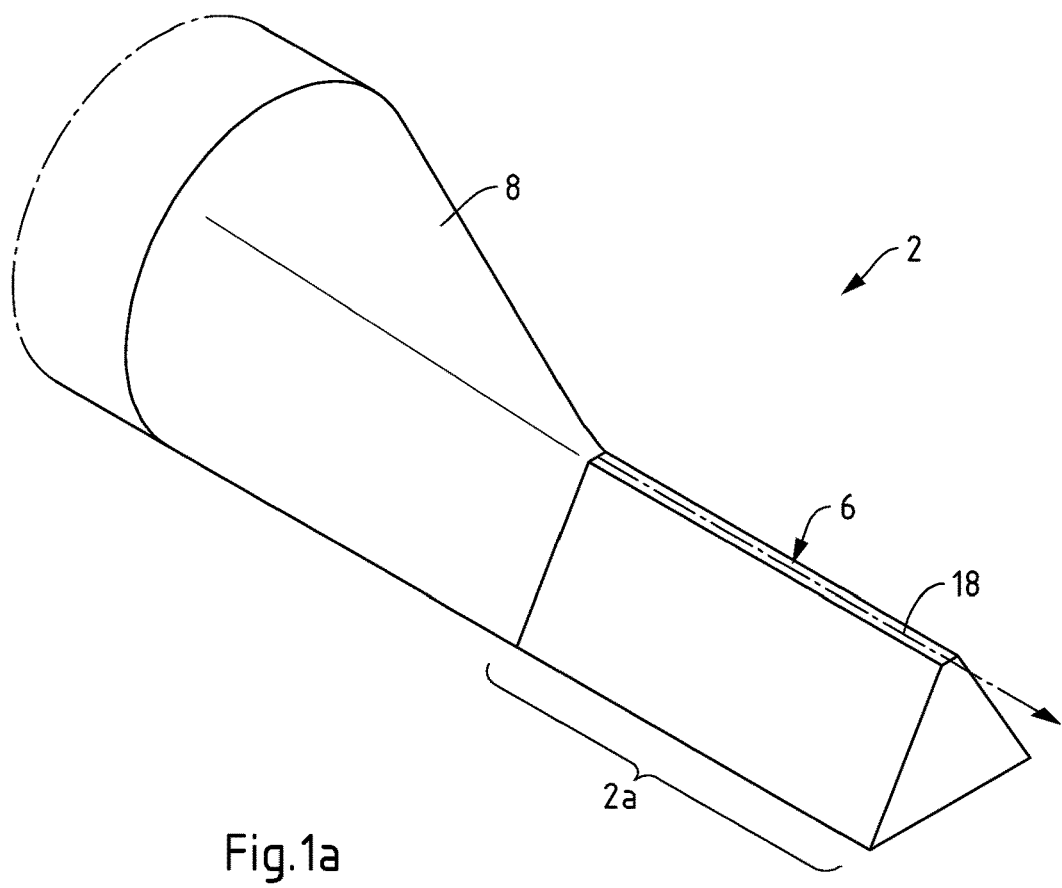
FIG. 1a shows a schematic representation of an embodiment of a carrier in a perspective view.

LED retrofit lamps should mimic the properties of their halogen counterparts in order to deliver at least equal performance while fulfilling all legal requirements without having to change the optics of the headlamp. One key attribute may be the radiation characteristic of the light emitted by such retrofits.

Due to different characteristics between halogen lamps and LEDs, it may be challenging to fit 100% of the halogen headlamp features into an LED retrofit headlamp. The main difficulty for regulation of LED retrofit may be to fit the same near-field (luminance image of the light source) and far-field (intensity profile) as its halogen counterpart. On the one hand, near field should fit the luminance of a limited filament (e.g., a rod of approximately 4 mm length and 1.4 mm diameter). On the other hand, far field should fit a 360° radial distribution of a filament or at least 300° radial distribution. Taking into account the luminous flux, the light distribution, and the limited space of the light emitting area, it may therefore be difficult to properly dissipate the heat produced by the LEDs. For at least this reason, there is currently no fully legal commercial LED retrofit headlamp available on the market.

To bypass the constraints listed above, a lot of non-legal LED retrofit headlamps have recently emerged. Those non-legal LED retrofit headlamps fulfil only a limited amount of halogen headlamp legal requirements. Typically, the requirements related to near emission field are not fulfilled and the luminous flux is strongly dimmed below the legal lumen requirement value as soon as the temperature exceeds a certain limit. Another drawback of current non-legal LED retrofit lamps may be the excessive glare for given portions of the emission field, which could be very dangerous (e.g., for the other drivers of vehicles since they could be blinded).

With respect to the legal LED retrofit headlamps, there are not many ways to fulfil the legal radiation pattern requirement of halogen headlamps. One of the easiest ways to mimic the radiation pattern of halogen headlamps may be to use, for example, multi-sided arrangements comprising one or more lighting modules. For instance, three-sided or even four-sided LED arrangements may be used, where many LEDs may be connected, for example, in serial and/or thermally. Such a multi-sided arrangement may be enabled by connecting each lighting module (e.g., an LED terminal) with the same polarity to heat sink portions having a small cross section. The respective heat sink portions may be elongated. Then, the respective heat sink portions may be electrically insulated and thermally connected.

Further, the lighting modules may be placed on a heat sink and face outwards. The main drawback of such arrangements may be that, if the legal requirements have to be fulfilled, problems with the thermal management may arise. For instance, the light has to be emitted from a very tight volume, and, as the LEDs face outward, only a small volume fraction remains on the backside of the LEDs for heat conducting material. Further, it may be very challenging to insulate the conductive tracks of the LEDs from the heat sink body and, at the same time, to have a good thermal connection between the LEDs and the heat sink.

Furthermore, insulation between bottom pads of the LEDs and the heat sink may be challenging. This may be particularly difficult to realize for typical bottom contact LED packages in which electrical pads may be directly in contact with the body of the heat sink.

Embodiments described herein may provide a lighting device having good thermal management, such as a lighting device where effective heat transport and electrical conduction may be provided while also being capable of fulfilling the legal requirements, such as with respect to having the same near-field and far-field as a halogen counterpart.

FIG. 1a shows a schematic representation of an embodiment of a carrier in a perspective view. The carrier 2 may include a heat sink body portion 8 and a mounting portion 6. The mounting portion 6 may be on top of a nose 2a of the carrier 2. The nose 2a and the heat sink body portion 8 may be thermally coupled to each other. The nose 2a may be in a V-shaped form and have a triangular cross section. The mounting portion 6 may have an arrangement direction 18. One or more lighting modules 4 can be arranged along the arrangement direction 18, for example, on a structure 16 that may be thermally coupled to the mounting portion 6.

Figure 1B:
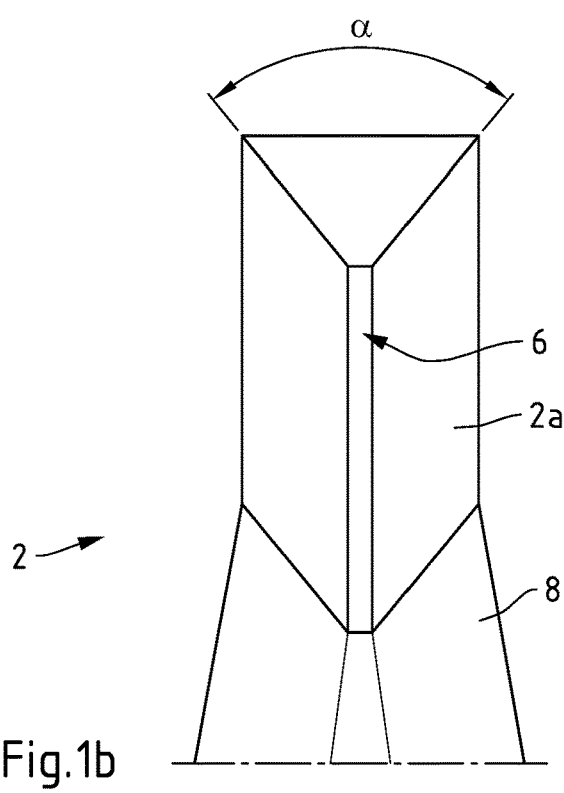
FIG. 1b shows the embodiment of FIG. 1a in a schematic front view.

FIG. 1b shows the schematic representation of FIG. 1a in a front view. It can be seen that the nose 2a comprising the mounting portion 6 may shadow emitted light from the one or more lighting modules 4 over an angle α of, for example, 58°, due to the V-shaped form of the carrier 2 in the region of the nose 2a. The nose 2a may be a truncated nose shadowing a limited angular range.

In embodiments, the triangular cross section of the nose 2a may have an opening angle of 0° to 90°, at least 30° to 65°, or 58°. For applications with greater heat generation requiring a greater heat transfer from the mounting portion to the heat sink body portion, opening angles, such as about 58°, may be desirable. It is tolerated that no light may be radiated in the angular range corresponding to the back lead wire of halogen lamps. It is foreseen that, for a plane orthogonal to the longitudinal axis of an automotive headlamp, the minimum luminous intensity may be defined starting from the so-called $C_{30}$-plane. For instance, a triangular cross section having an opening of at least 30° may enable that no light has to be emitted for an angular region between −29° to +29°. The triangular cross section may be in such a way capable to provide enough heat dissipation away from the lighting module while at the same time allowing the legal requirements to be met.

The heat sink body portion may be arranged adjacent to the mounting portion with the heat sink body portion in thermal contact with the mounting portion, such that heat generated by one or more lighting modules mounted on the respective mounting face or faces can be transferred from the mounting portion to the heat sink body portion. The heat sink body portion may include a volume and/or surface configured to provide heat dissipation suitable for the heat generated by the lighting module or modules and to provide cooling for the lighting module or modules. The heat sink body portion may be a truncated heat sink body portion (e.g., in the form of a nose). In this case, shadowing LED light radiation over an angular range of 59° may be within regulation requirements for the LED retrofit headlamp, such as for automotive lighting appliances. Such a truncated heat sink body portion may be used to support the lighting module and to transport the heat as well.

In embodiments, the heat sink body portion may protrude sidewards relative to the arrangement direction in that the heat sink body portion extends beyond at least one side edge of the mounting face. "Protruding sidewards" may be understood in that, when a viewer faces a respective mounting surface, for example in a direction perpendicular to the mounting face, the heat sink body portion extends at least beyond one side edge of the mounting face. The heat sink body portion may extend substantially parallel to the arrangement direction.

Figure 2A:
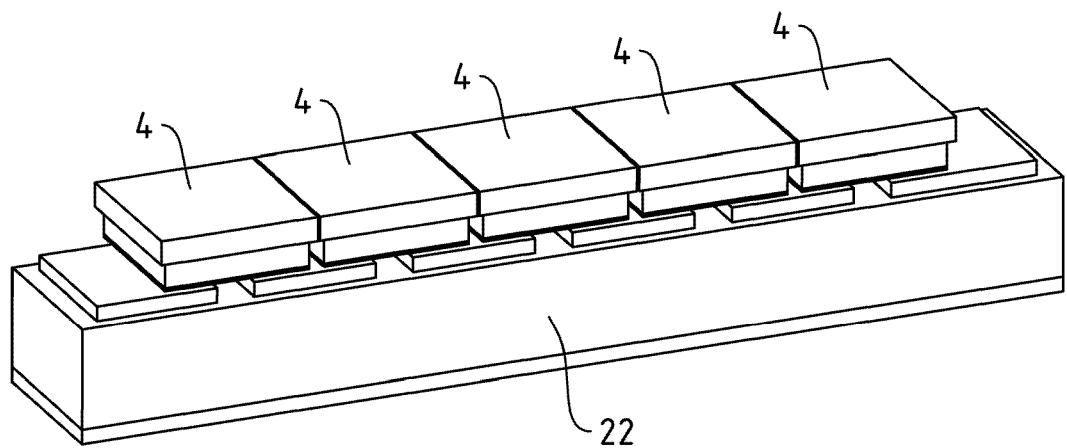
FIG. 2a shows a schematic representation of a structure to be mounted to a lighting device in a perspective view.

FIG. 2a shows, in a perspective view, a schematic representation of a structure to be mounted as part of an embodiment of a lighting device 12. The ceramic substrate 22 may be, for example, a ceramic direct bonded copper (DBC) substrate. The copper may be represented by a routing layer attached to the ceramic substrate 22. The routing layer may be divided into several contact sections enabling one or more lighting modules 4 to be mounted to the ceramic substrate 22. The lighting modules 4 may be connected in series via the contact sections.

Figure 2B:
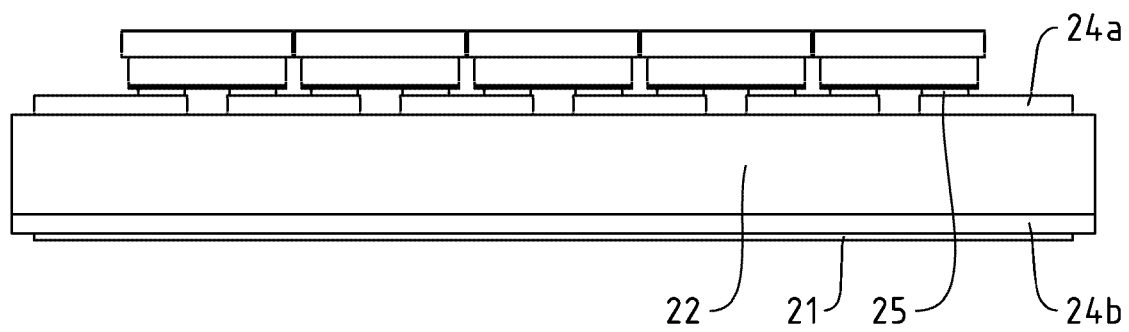
FIG. 2b shows the schematic representation of FIG. 2a in a schematic side view.

FIG. 2b shows the schematic representation of FIG. 2a in a side view. The ceramic substrate 22 may include a top routing layer 24a on its top connected by solder attaches 25 to the lighting modules 4. The ceramic substrate 22 may further include a bottom routing layer 24b on its bottom. Both routing layers 24a and 24b may be made of copper, such as copper bonded to the ceramic substrate 22. The ceramic substrate 22 may have a thermal interface 21 that is thermally conductive (e.g., to be thermally coupled to the mounting portion 6 of the carrier 2). It will be understood that in the embodiment shown in FIG. 2b, lighting modules are not to be attached to the bottom routing layer 24b.

The structure to be mounted to the at least one mounting face may at least be thermally coupled to the mounting portion of the carrier. Alternatively, the structure may also be formed, for example, integrally with the at least one mounting portion. In both alternatives, the structure may be thermally coupled to the mounting portion so that heat can be dissipated away from the mounting portion in which the lighting module is mounted along the arrangement direction of the mounting face. The mounting face may provide a suitable mounting surface for one or more lighting modules. For instance, the mounting face may be at least partially flat or planar to provide an area suitable to accommodate the lighting module or modules, such as an LED die or dies.

According to an exemplary embodiment, the at least one structure may have at least partly a concave or inwardly recessed cross section, where the at least one mounting face may correspond at least partly to the surface area of the at least one structure having the concave or inwardly recessed cross section and at least two lighting modules may be mounted on the at least one mounting face at least partly facing each other. Under "facing each other", it may be understood that the light emitting surfaces of the at least two lighting modules may face each other so that at least a part of the light emitted by the at least two lighting modules may be directed into the same volume fraction. A minimum of crosstalk may be caused (e.g., light from one of the at least two lighting modules may overlap with light from the other of the at least two lighting modules).

Contrary to the inward alignment as described above, in this way at least two lighting modules can face at least partly outwards. The angle between the light-emitting sides of the lighting modules can be chosen such that crosstalk between the lighting modules is minimized while as much light as possible is directed inwards. Further, by mounting the at least two lighting modules at least partly at the inwardly recessed or concave surface of the at least one structure, more lighting modules can be mounted, allowing for a larger primary light output and hence a larger luminous flux.

According to an exemplary embodiment, the at least two lighting modules may be mounted on the at least one mounting face enclosing an angle of at least 30° and/or at most 135° between the planes defined by their respective top surfaces. These angle ranges may allow for a minimization of crosstalk between the at least two lighting modules and a maximization of the increase in volume fraction available for heat dissipation. In embodiments, the angle may be at least 90° to minimize cross talk and/or, in embodiments, at most 100°.

According to an exemplary embodiment, the at least one structure may include a ceramic substrate (e.g., a wafer) for receiving the at least one lighting module. The ceramic substrate may include, on at least one side, a routing layer for electrical coupling of the at least one lighting module. The respective routing layer or layers may provide, for example, one or more contact sections so that lighting module or modules can be mounted to the contact section or sections. The respective routing layer or layers may be made out of copper. To manufacture such a ceramic substrate, for example, the routing layer may be formed, for example, by patterning (e.g., printing or chemical etching) such copper routing layer or layers on the surface of a ceramic wafer. The structure may be formed by a ceramic substrate thermally coupled to the at least one mounting portion. The ceramic substrate may be a monolithic ceramic tile. The ceramic substrate may be non-conductive. The ceramic substrate may have a rectangular cross-section. The ceramic substrate may be an Aluminium Nitride (AlN) substrate.

The lighting device, according to example embodiments, may be configured for a use in automotive lighting, for example as part of an automotive head light, automotive exterior light, automotive interior light or aerospace interior or exterior light. The lighting device may in particular be used for appliance in automotive head lamps.

Figure 3A:
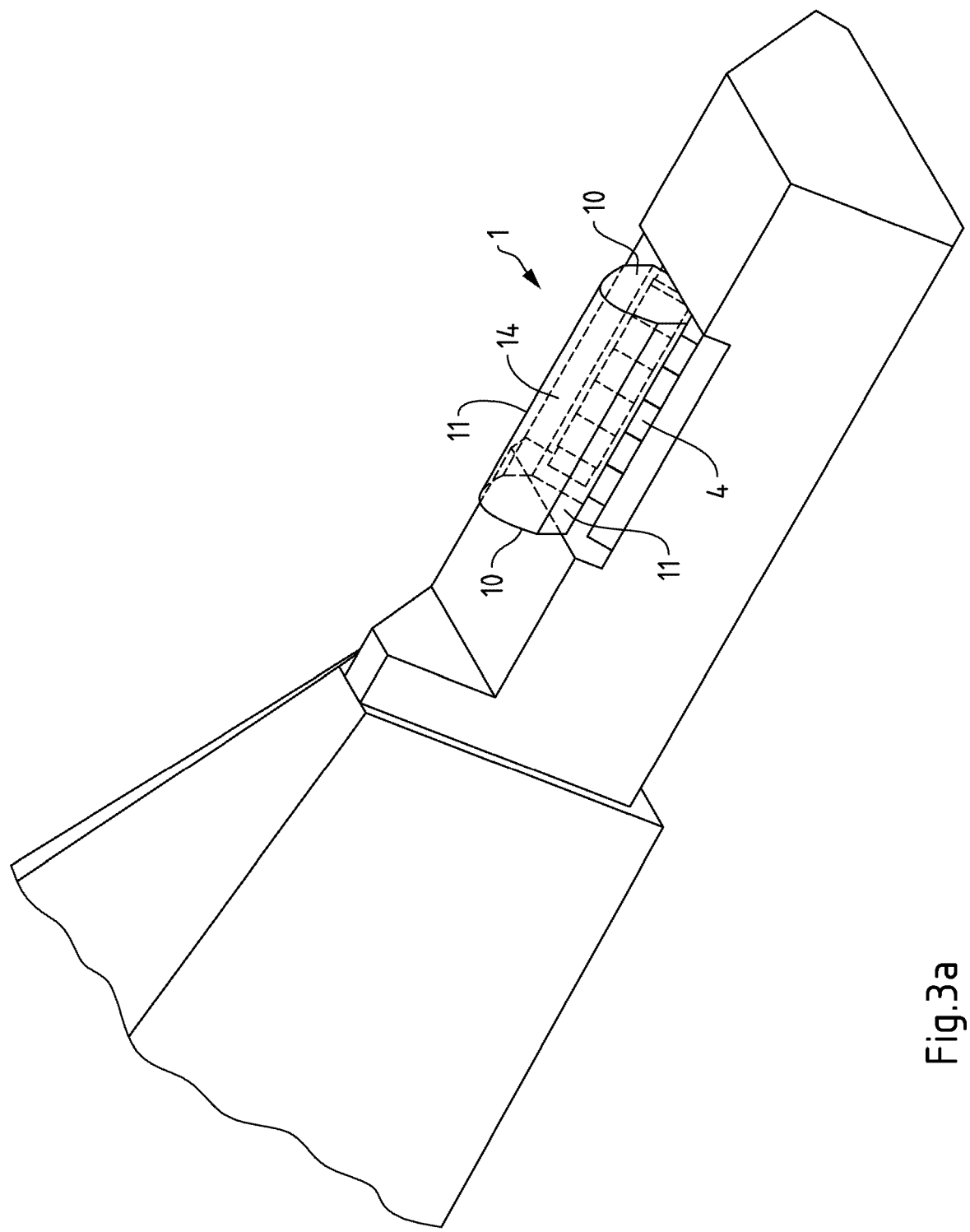
FIG. 3a shows a schematic representation of an embodiment of a light guide in a perspective view.
Figure 3B:
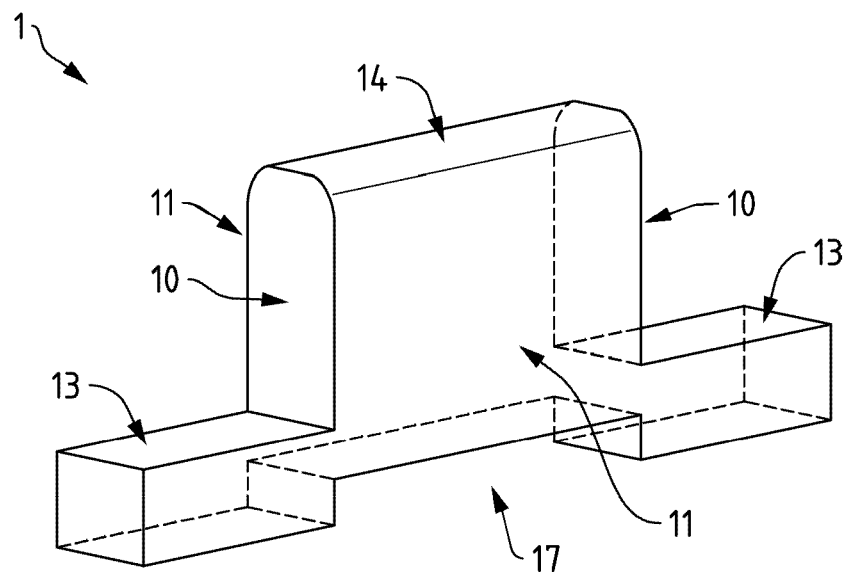
FIG. 3b shows a schematic representation of another embodiment of a light guide in a perspective view.
Figure 3C:
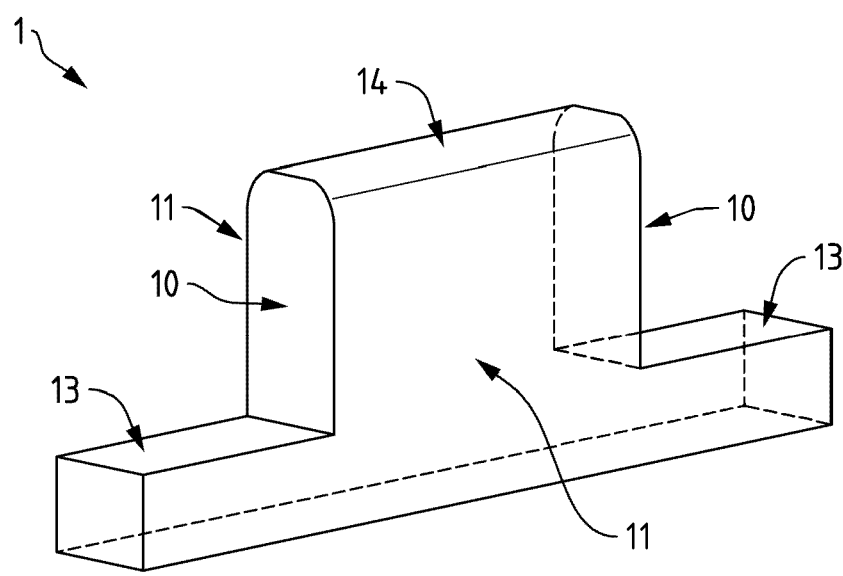
FIG. 3c shows a schematic representation of a further embodiment of a light guide in a perspective view.

FIGS. 3a-c show schematic representations of embodiments of a light guide in perspective views. The light guides in FIGS. 3a to 3c each have two transmissive side surfaces 10 and two scattering side surfaces 11. The light guides in FIGS. 3b and 3c each have two extensions 13 for aligning the respective light guide 1 to the structure 16 and fixing the light guide 1 to carrier 2. The light guide 1 of FIG. 3a has a top surface 14, which includes a single parabolically shaped part. The light guide 1 of FIG. 3b has a top surface 14, which comprises two parabolic cylinder shaped parts and a flat part arranged between the two parabolic cylinder shaped parts. The light guide 1 of FIG. 3c has a fully parabolic cylinder shaped top surface. The light guide 1 of FIG. 3b has one cut out 17, which can serve to align the light guide to a lighting module, which in at least one dimension fits into the cut out, and provide an air gap 15 between a lighting module 4 and the light guide 1, when the light guide 1 is optically coupled to a lighting module 4.

A light guide can carry light over a distance via a particular route to a defined light-emitting surface (e.g., with minimal loss). The radiation characteristic of the light emitted from the light guide can, hence, be precisely controlled to, for example, fulfil the legal requirements. To this end, a suitable transmittance and/or reflectivity of the surfaces of the at least one light guide may be adjusted. The light guide can be manufactured from any suitable optically transparent material. The light-emitting surface of the at least one light guide may not be larger than 4 mm×1.4 mm.

The light guide may be aligned to the at least one lighting module by placing the light guide inside a three sided cavity of the mounting portion of the carrier.

Light emitted by at least two lighting modules may be redirected via at least one light guide to achieve a legally required emission pattern. In embodiments, the light guide can be replaced by a different light guide to fulfil, for example, legal requirements of different jurisdictions, without the need to redesign the whole lighting device.

As the lighting modules may face at least partly inwards, a large volume fraction may be available on the backside of the lighting modules for heat conducting material as well as for insulating the conductive tracks of the lighting modules from the heat sink body. For instance, the width of the at least one structure perpendicular to the arrangement direction can be increased by a factor of at least 40% or 50% compared to a conventional outward facing arrangement without impairing the fulfilment of the legal requirements. The corresponding gain in volume can be used for heat sink or heat conduction material, leading to a better thermal management, and/or it can, for example, be used to drive fewer lighting modules at higher currents. In embodiments, the at least one structure may have an at least partly concave or inwardly recessed cross section perpendicular to the arrangement direction.

According to an exemplary embodiment, the at least one light guide may have at least two scattering side surfaces that may be configured to cause at least 90% diffuse scattering of incoming light and/or at least two transmissive side surfaces that may be configured to allow at least 70% transmission of incoming light. According to an exemplary embodiment, the at least two scattering surfaces on the at least one light guide may be formed or created by means of sand blasting, roughening, or scatter coating using, for example, Titanium Dioxide ($TiO_2$), for example, in a proper matrix material (e.g., silicone).

The at least two transmissive side surfaces may be configured to allow at least 75% transmission of incoming light, and/or the at least two scattering side surfaces may be configured to cause at least 95% diffuse scattering of incoming light, for example, in a Lambertian fashion. This may allow for an optimal redirection of the light emitted by the at least one lighting module in the at least one light guide to achieve the legally required emission pattern, such as the near field luminance. This can be achieved even more effectively when the at least two transmissive side surfaces are placed essentially perpendicular to the at least two scattering side surfaces. According to an exemplary embodiment, the at least two transmissive side surfaces may be produced by dielectric coating (e.g., multilayer) or a metal (e.g., aluminium or silver coating).

The at least two scattering side surfaces may be arranged parallel to the arrangement direction. In embodiments, the at least two scattering side surfaces may be configured to cause at least in part partial reflection of incoming light causing at least partly a reflection of light back into the light guide so that light can be redirected with less intensity losses. Light emitted by the at least one lighting module in this way may propagate almost isotopically transverse to the arrangement direction. Having scattering side surfaces with partial reflection along the arrangement direction may allow to achieve the legally required emission pattern, such as the far field. However, the partial reflectivity of the respective side surfaces in this case should be below 100% to achieve good results. The partial reflectivity may be between 20% to 30%, (e.g., 25%) reflection, and, thus, transmission may be between 80% to 70% (e.g., 75%). These ranges may ignore absorption that can happen in addition.

Alternatively to, or in combination with, the at least two scattering side surfaces, the material of the at least one light guide may be configured to cause volume scattering. The at least two transmissive side surfaces may be arranged perpendicular to the arrangement direction so that the light emitted by the at least one lighting module may be optimally distributed in forward and backward direction along the arrangement direction.

According to an exemplary embodiment, the at least one light guide may have at least one top surface, where the at least one top surface has at least partly a parabolic cylinder shape with respect to the arrangement direction. When the light guide is optically coupled to the lighting module or modules, the top surface may in particular be situated essentially facing away from the structure or essentially opposite of the lighting module or modules. The light guide may have at least partly a parabolic cross section perpendicular to the arrangement direction allowing for a particularly good fulfilment of the legal far-field requirements. The top surface may, for example, have a single parabolic cylinder shape. Alternatively, the top surface of the light guide may include two parabolic cylinder shaped parts and a flat part arranged between the two parabolic cylinder shaped parts. The at least one top surface of the at least one light guide may be formed as a scattering surface by structuring, for example by means of sand blasting, roughening, or scatter coating. The at least one top surface may have the optical characteristics described for the at least two scattering side surfaces.

The light guide may further have at least one bottom surface that may at least partly face the at least one lighting module. The at least one bottom surface of the at least one light guide may be flat, for example in the case where only one lighting module is mounted to the at least one structure. The at least one bottom surface may also have a shape resulting from the bottom part of the at least one light guide resembling a polygon so that respective sides of the polygonal shape face a respective on of at least two lighting modules. In the case of at least two lighting modules mounted along the arrangement direction on two mounting faces of the at least one carrier, the bottom part of the light guide may be formed as a wedge enclosing an angle of around 90°.

According to an exemplary embodiment, the at least one light guide may have at least one extension for aligning the at least one light guide to the structure. The at least one extension may have at least partly a V-shape, with the at least one carrier having a respective matching inverse V-shape, such that alignment of the at least one light guide may be enhanced. The at least one extension may be integrally attached to or formed with the light guide or may be a separate part attached to the light guide, for example by means of screwing or gluing.

According to an exemplary embodiment, the at least one light guide may be fixed to the carrier at least partly by means of the at least one extension. For example, at least one clamping device may be formed in the at least one carrier or a separate clamping device may be attached to the at least one carrier, such that the at least one clamping device can clamp the at least one extension, such that a mechanical connection between the at least one light guide and the at least one structure may be provided. A clamping device may for instance be formed from a metal sheet, such as a metal sheet of 100 to 400 µm (e.g., 300 µm) thickness. The at least one clamping device or formed metal sheet may conform to the shape of the at least one carrier or heat-sink nose to avoid shadowing effects. The at least one clamping device may be mechanically connected to the at least one carrier, for example by means of clamping. A firmer attachment of the clamping device to the at least one carrier can be accomplished by introducing at least one recess into the surface of the at least one carrier with the at least one clamping device having at least one corresponding extrusion or vice versa. Also, dents may be applied to the bottom side of the at least one carrier, the bottom side being located essentially opposite to the at least one mounting face. Other attachments of the at least one clamping device or formed metal sheet to the at least one carrier, such as the heat-sink nose, like screwing, riveting or hot stacking may also be possible.

According to an embodiment, the at least one clamping device may be produced by forming the at least one metal sheet after the light guide is optically coupled to the at least one lighting module, for example by bending the at least one metal sheet in several steps, such as around the at least one carrier and an at least one light guide extension, until the at least one light guide is fixed.

According to an embodiment, the at least one light guide may include or consist of glass or silicone. These materials may allow for an optimal light propagation in the light guide.

According to an exemplary embodiment, at least one air gap may be present between the at least one light guide and the at least one lighting module. This configuration may allow for improved optical efficiency. In the case that the lighting module or modules include an optical converter configured to change the wave length of the light emitted, for example, by an LED, the at least one air gap may be present between the top surface of the optical converter, for example a phosphor converter, and the at least one light guide.

Figure 4A:
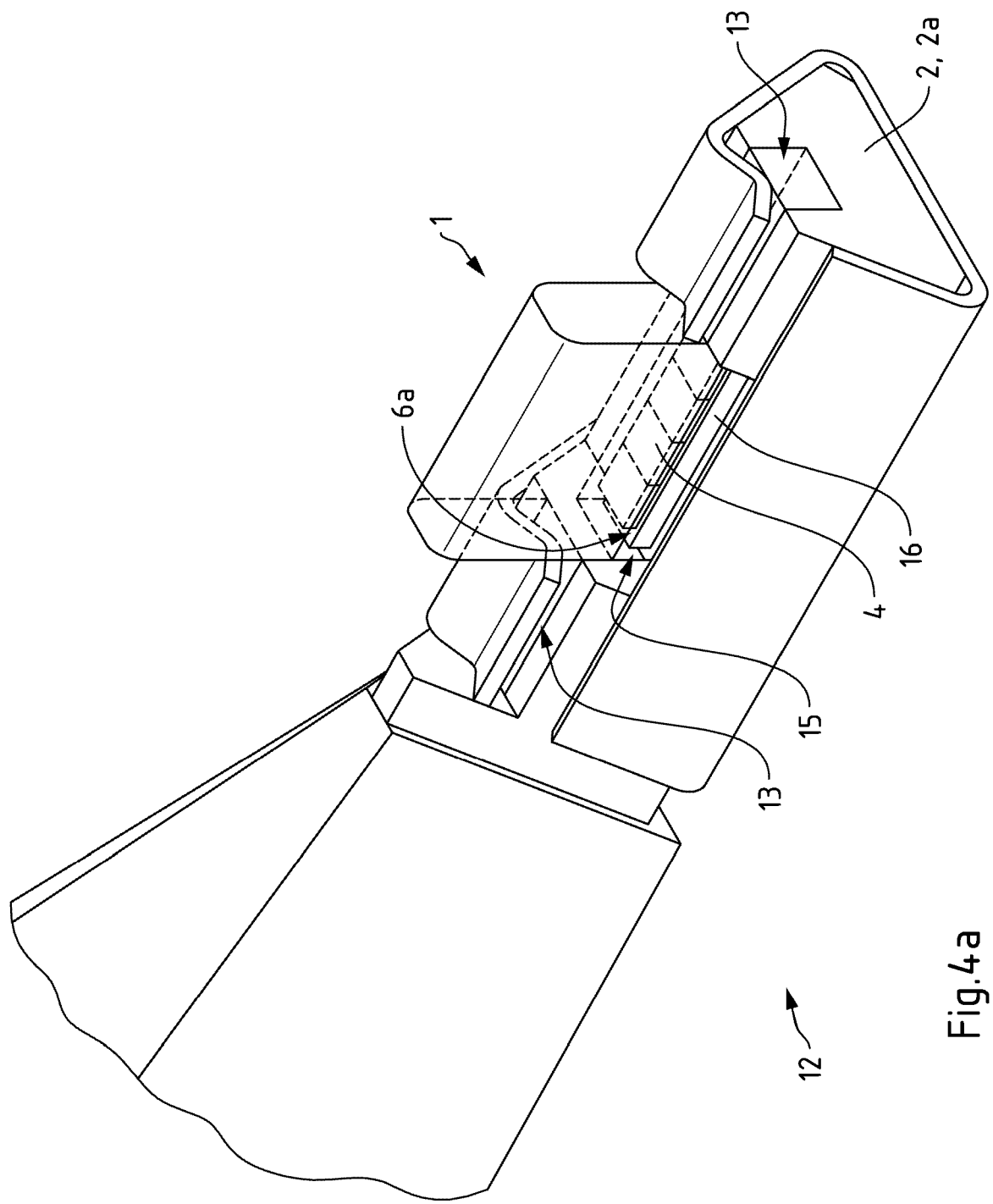
FIG. 4a shows a schematic representation of an embodiment of a lighting device in a perspective view.

FIG. 4a shows a schematic representation of an embodiment of a lighting device 12 in a perspective view in which the embodiment of the light guide 1 from FIG. 3b is optically coupled to the four lighting modules 4 received by a mounting face 6a of structure 16. The cut off 17 of light guide 1 in between the two extensions 13 may house the structure 16 and the lighting modules 4 so that the light guide 1 may be properly aligned to the structure 16 and the lighting modules 4. The light guide 1 may be fixed to the carrier 2, such as to a part of the nose 2a, by a clamping device 34 made from a 300 µm thick metal sheet. In embodiments, one clamping device 34 may clamp both extensions 13, such that a mechanical connection between the light guide 1 and the structure 16 may be provided. The clamping device 34 may conform to the shape of the carrier 2 and heat-sink nose 2a to avoid shadowing effects. The clamping device 34 may be mechanically connected to the carrier 2 by means of clamping.

Figure 4B:
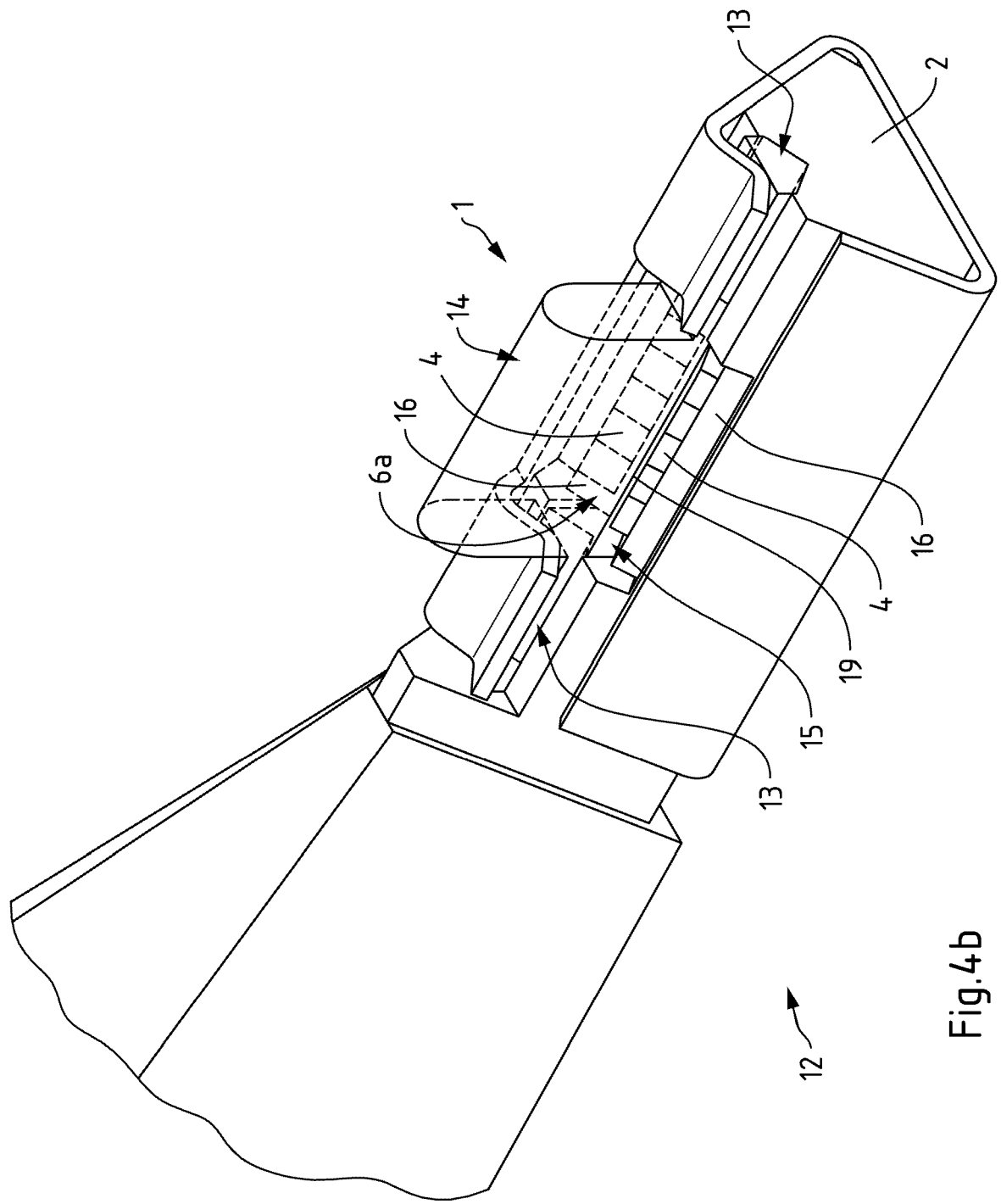
FIG. 4b shows a schematic representation of another embodiment of a lighting device in a perspective view.

FIG. 4b shows a schematic representation of another embodiment of a lighting device in a perspective view. Two structures 16 having four lighting modules 4 each may be mounted in a receptacle of the carrier 2 so that the lighting modules 4 of one of the two structures 16 along with the lighting modules of the other structure 16 enclose an angle of around 90° between the planes defined by their respective top surfaces. The top surface 14 of the light guide 1 may have a parabolic cylinder shape with respect to the arrangement direction 18. The bottom surface 19 of the light guide 1 may have a shape resulting from the bottom part of the light guide 1 resembling a polygon, so that respective sides of the polygonal shape may face each of the at least two lighting modules 4. In this case, the bottom part of the light guide 1 may be formed as a wedge enclosing an angle of around 90°. Further, each of the two extensions 13 in cross section partly may have a V-shape, with the carrier 2 having a respective matching inverse V-shape, such that alignment of the light guide 1 may be enhanced.

The mounting face may have an arrangement direction that is configured for accommodating the lighting module or modules arranged along the arrangement direction. The arrangement direction may correspond to an extension direction of the respective mounting face and/or of the lighting module or modules. For instance, the arrangement direction may correspond to a longest dimension of the respective mounting face and/or of the lighting module or modules. The mounting face may in particular be configured such that multiple (e.g., at least two) lighting modules, for example in form of a lighting module package, may be arranged along a line, such as a straight line, where the arrangement direction may correspond to the orientation of the line of lighting modules.

The lighting module or modules may include at least one semiconductor element capable of light emission. In particular, the lighting module may include at least one light emitting diode (LED). For instance, the LEDs may be provided in form of separate or combined LED dies and/or LED packages, where the LED may be arranged on a substrate, such as a sapphire substrate. An LED package may include a wavelength conversion element (e.g., based on phosphor) and/or may comprise at least one optical element, such as a diffusing layer, a diffractive element (e.g., a lens) and/or a reflective element (e.g., a reflector cup). The LED or LEDs may, for instance, be integrated into an LED lead frame. The lighting module or modules may be mounted along the arrangement direction of the at least one mounting face to the at least one structure. The at least one lighting module may be soldered to the at least one structure.

Figure 5A:
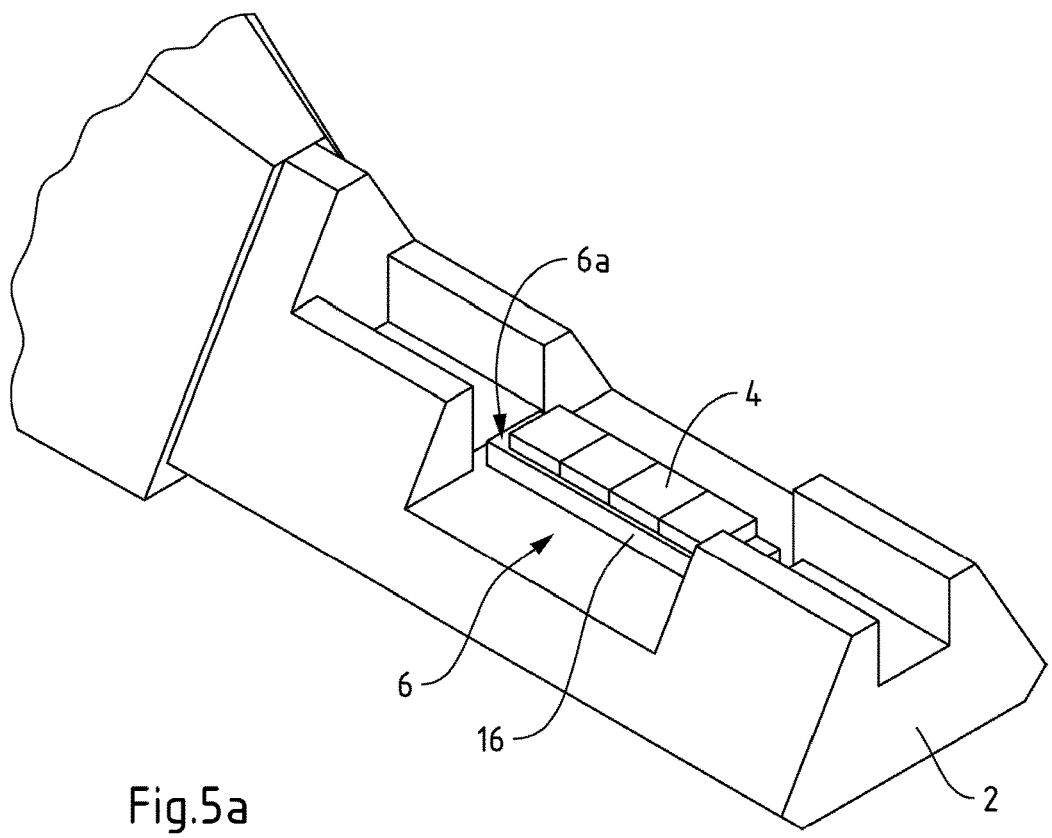
FIG. 5a-c show schematically the method of production of an embodiment of a lighting device in perspective views.
Figure 5B:
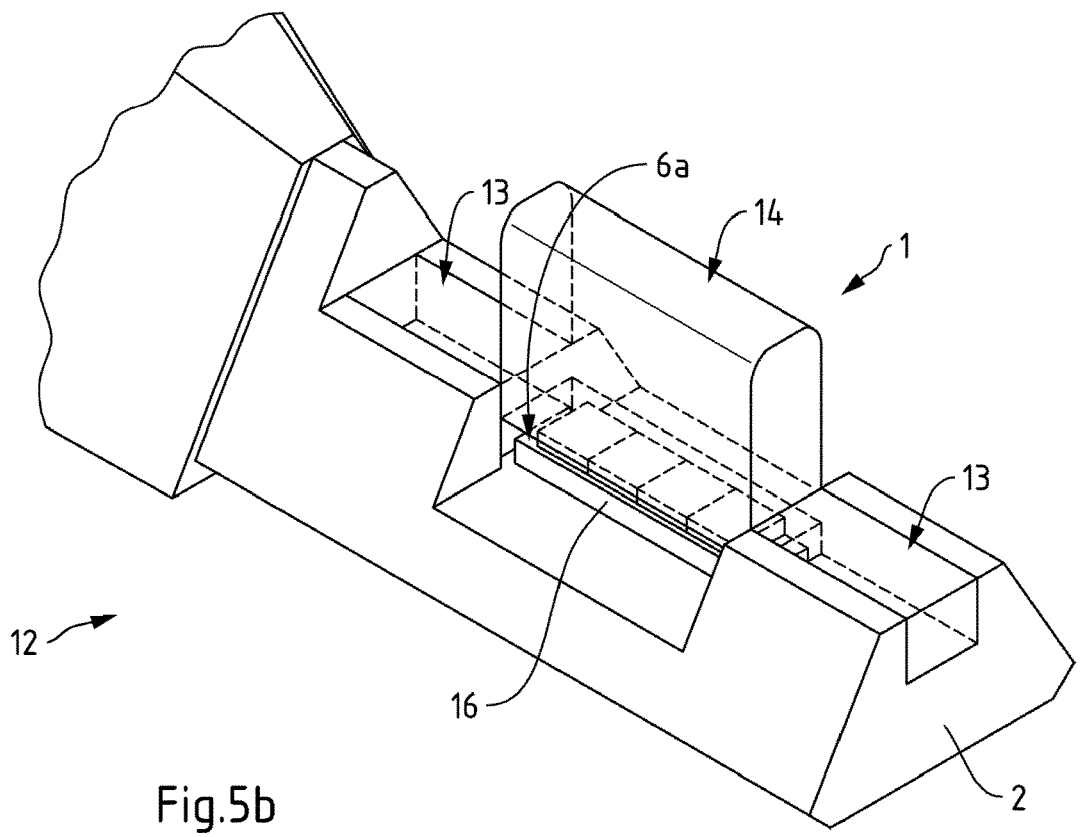
Figure 5C:
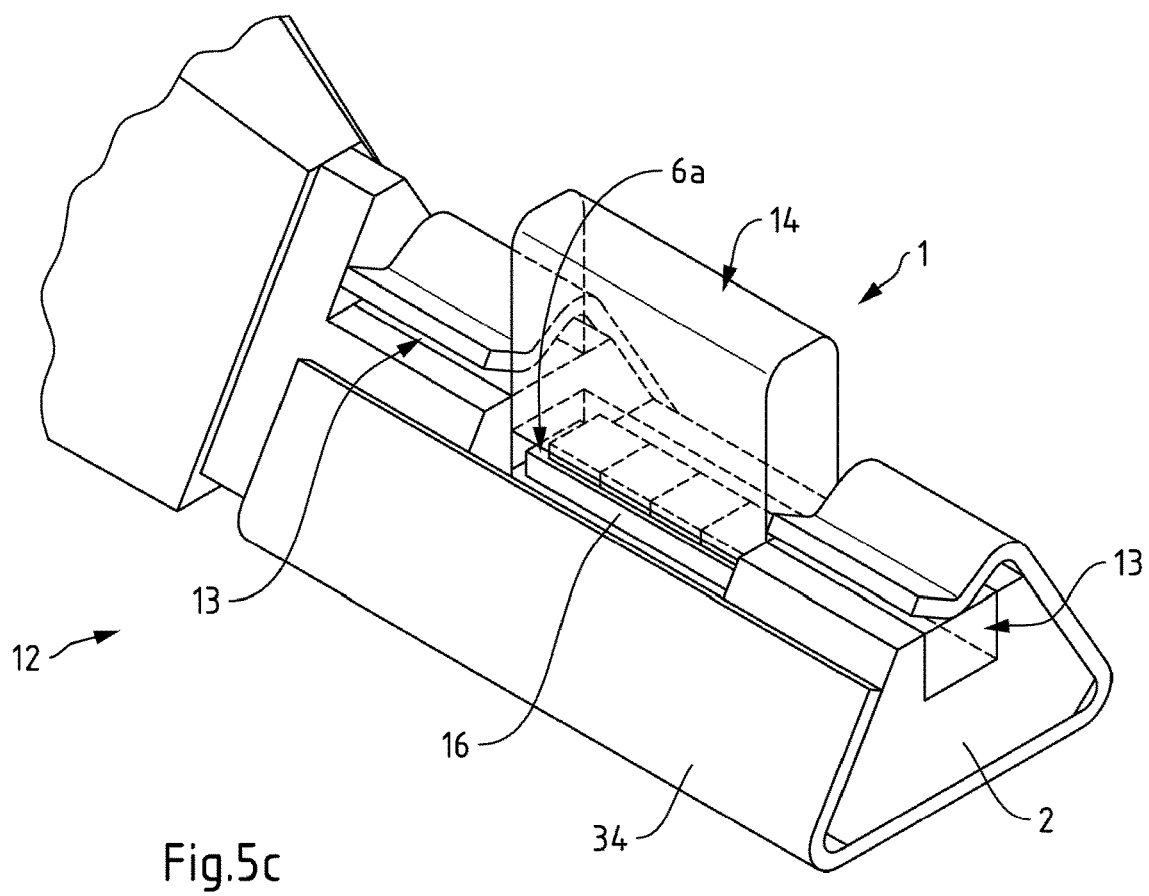

FIGS. 5a-c show schematically a method of production of an embodiment of a lighting device in a perspective view. The carrier 2 may have a triangular cross section in sections. The mounting portion 6 may be arranged on an edge of the triangular cross section. In FIG. 5a a structure 16 may be mounted in the mounting portion 6, and four lighting modules 4 may be arranged along the arrangement direction of the mounting face 6a to structure 16. In FIG. 5b, the light guide 1 is optically coupled to the lighting modules 4 by mounting it on the carrier 2 inside a respective receptacle. It may be aligned using receptacles for the extensions 13 in the carrier 2. In FIG. 5c, the light guide is fixed by clamping the light guide 1 via the extensions 13 and a clamping device 34.

Figure 7:
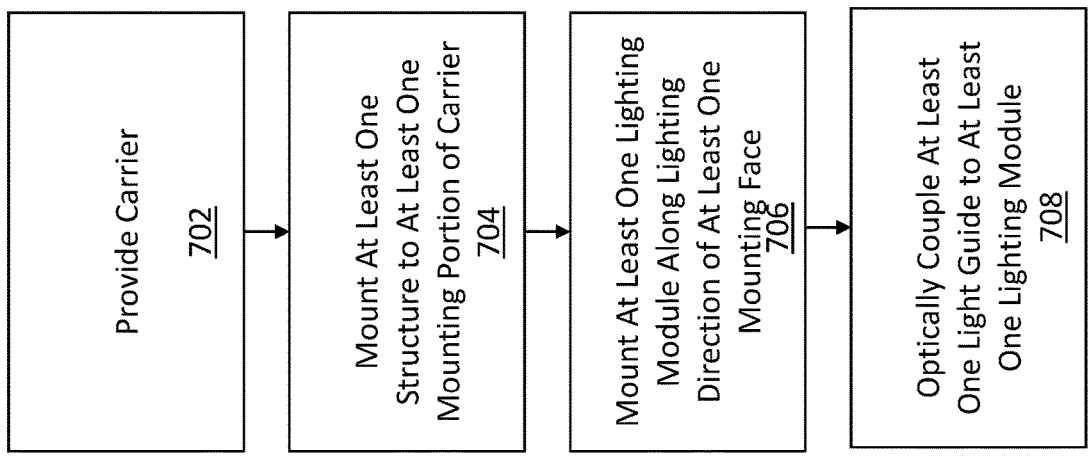
FIG. 7 is a flow diagram of an example method of manufacturing a lighting device.

FIG. 7 is a flow diagram of a method of manufacturing a lighting device. In the example illustrated in FIG. 7, the method includes providing a carrier (702). In embodiments, the carrier has at least one section that has a triangular cross section. The carrier may include at least one mounting portion on an edge of the triangular cross section and a heat sink body portion adjacent to, and protruding sidewards from, the at least one mounting portion. The method may also include mounting at least one structure to the at least one mounting portion of the carrier (704). The at least one structure may include at least one mounting face and may be thermally coupled to the at least one mounting portion. The method may also include mounting at least one lighting module along an arrangement direction of the at least one mounting face to the at least one structure (706). The method may also include optically coupling at least one light guide to the at least one lighting module (708).

Figure 6:
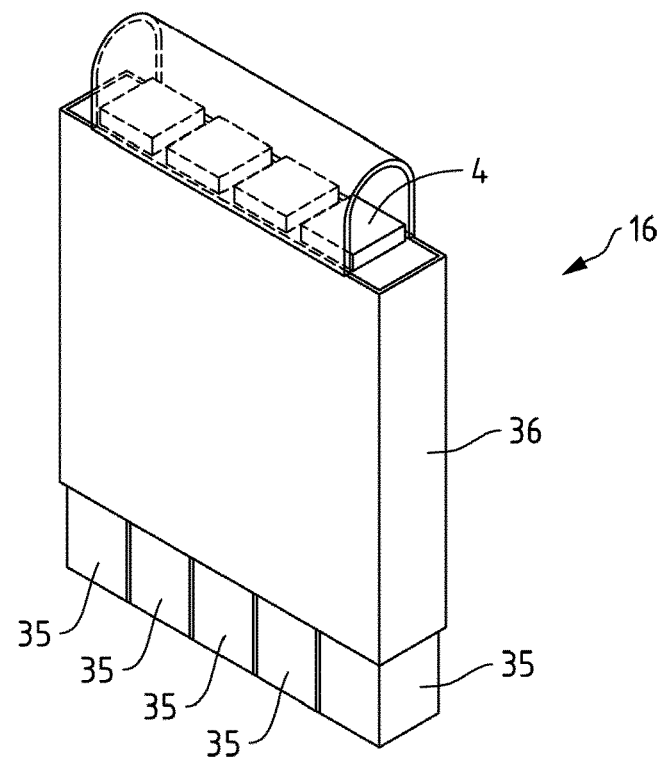
FIG. 6 shows a schematic representation of a structure having five heat fingers.

FIG. 6 shows a schematic representation of a structure 16 having five heat fingers 35. The five heat fingers 35 may be glued together using a silicone glue to provide electrical insulation. The five heat fingers may be surrounded by a silicone layer 36 to prevent electrical shortcuts via the heat sink 2.

In some embodiments, the at least one structure may include at least two or five or more heat fingers electrically insulated against each other. At least one heat finger may be connected to the pads of in maximum two LED dies, if those pads are in an electrical connection (e.g., if LEDs are in a series connection). The at least two heat fingers may be glued together using, for example, a silicone glue to provide electrical insulation. In some embodiments, the at least two heat fingers may be surrounded by a silicone layer to prevent electrical shortcuts via the heat sink. The above described multi-sided arrangement may be used so that at least two of such heat fingers are enabled. In this way, for example, there may be only a single mounting portion that may not need to be electrically insulated from the heat sink since it may not be electrically conductive.

What is claimed is:

1. A lighting device comprising:
   a carrier having at least one section that has a triangular cross section and comprises three edges and five planar surfaces, the carrier comprising:
   at least one mounting portion on at least one of the three edges of the triangular cross section, and
   a heat sink body portion adjacent to, and protruding sidewards from, the at least one section;
   at least one structure mounted to the at least one mounting portion, the at least one structure comprising at least one mounting face having an arrangement direction;
   at least one lighting module mounted along the arrangement direction on the at least one mounting face; and
   at least one light guide optically coupled to the at least one lighting module.

2. The lighting device as claimed in claim 1, wherein:
   the at least one structure has at least partly a concave cross section,
   the at least one mounting face corresponds at least partly to a surface area of the at least one structure having the concave cross section, and
   the at least one lighting module comprises at least two lighting modules mounted on the at least one mounting face at least partly facing each other.

3. The lighting device as claimed in claim 2, wherein the at least two lighting modules are mounted on the at least one mounting face enclosing an angle of at least 30° and at most 135° between planes defined by their respective top surfaces.

4. The lighting device as claimed in claim 1, wherein:
   the at least one structure has at least partly an inwardly recessed cross section,
   the at least one mounting face corresponds at least partly to a surface area of the at least one structure having the inwardly recessed cross section, and
   the at least one lighting module comprises at least two lighting modules mounted on the at least one mounting face at least partly facing each other.

5. The lighting device as claimed in claim 1, wherein the at least one light guide has at least two scattering side surfaces configured to cause at least 90% diffuse scattering of incoming light and at least two transmissive side surfaces configured to allow at least 70% transmission of incoming light.

6. The lighting device as claimed in claim 5, wherein the at least one light guide has at least one top surface, and the at least one top surface has an at least partly parabolic cylinder shape with respect to the arrangement direction.

7. The lighting device as claimed in claim 1, wherein the at least one light guide has at least one extension for aligning the at least light guide to the at least one structure.

8. The lighting device as claimed in claim 1, wherein the at least one light guide comprises glass.

9. The light device as claimed in claim 1, wherein the at least one light guide comprises silicone.

10. The lighting device) as claimed in claim 1, further comprising at least one air gap between the at least one light guide and the at least one lighting module.

11. The lighting device as claimed in claim 1, wherein the at least one structure comprises a ceramic substrate for receiving the at least one lighting module, the ceramic substrate comprising, on at least one side, a routing layer for electrical coupling of the at least one lighting module.

12. An automotive exterior light comprising:
a lighting device comprising:
　a carrier having at least one section that has a triangular cross section and comprises three edges and five planar surfaces, the carrier comprising:
　　at least one mounting portion on at least one of the three edges of the triangular cross section, and
　　a heat sink body portion adjacent to, and protruding sidewards from, the at least one section;
　at least one structure mounted to the at least one mounting portion, the at least one structure comprising at least one mounting face having an arrangement direction;
　at least one lighting module mounted along the arrangement direction on the at least one mounting face; and
　at least one light guide optically coupled to the at least one lighting module.

* * * * *